June 18, 1957  W. S. MILES ET AL  2,796,158
WALL ASSEMBLY
Filed Oct. 22, 1947  10 Sheets-Sheet 2

INVENTORS
WILLIAM S. MILES
ROBERT L. SIERING
ATTORNEY

June 18, 1957 — W. S. MILES ET AL — 2,796,158
WALL ASSEMBLY

Filed Oct. 22, 1947 — 10 Sheets-Sheet 3

INVENTOR
WILLIAM S. MILES
and ROBERT L. SIERING
BY Virgil C. Kline
ATTORNEY

June 18, 1957 W. S. MILES ET AL 2,796,158
WALL ASSEMBLY
Filed Oct. 22, 1947 10 Sheets-Sheet 8

INVENTORS.
WILLIAM S. MILES
and ROBERT L. SIERING
BY
ATTORNEY.

United States Patent Office 2,796,158
Patented June 18, 1957

2,796,158
WALL ASSEMBLY

William S. Miles, Hastings-on-Hudson, and Robert L. Siering, New York, N. Y., assignors to Johns-Manville Corporation, New York, N. Y., a corporation of New York Application October 22, 1947, Serial No. 781,334

14 Claims. (Cl. 189—34)

The present invention relates to improved wall assemblies of the kind specially adapted for sub-dividing interior space into individual rooms, offices and the like, and to improved elements for use in the construction and erection of such assemblies. The invention is particularly concerned with demountable walls, i. e., walls which may be readily assembled and disassembled to permit the rearrangement or reconstruction of the room structure or to permit the wall to be salvaged for re-use in other locations.

A principal object of the invention is to provide an improved wall construction of the type referred to above in which all the parts are of incombustible materials. The wall also is one which may be very quickly and easily assembled and disassembled with a minimum of skilled labor, which is entirely salvageable and re-usable, and which is flexible, permitting ready variation in specific construction features.

Another object of the invention is the construction of a wall system employing simplified parts as compared to known systems of the same general type.

Another object of the invention is the provision of a wall assembly comprising, as essential elements, apertured studs, facing panels forming points at the studs, and snap-on type fastening elements including head portions overlapping the margins of the panels at the joints and arms passing through the joints and through the stud apertures into gripping engagement with the rear face of the stud, the fastening elements holding the panels against outward movement. The assembly also includes members secured to the studs for supporting the panels against downward movement. These members, in addition, carry the baseboards.

A further object of the invention is the provision of improved fastener elements, particularly for use in the above assembly, the elements being of a type which resiliently bind the facing panels to the studs and in addition serve as a track or support for a decorative strip concealing the joint between adjacent panels.

A still further object of the invention is the provision of an assembly of the type referred to which is extremely flexible, permitting the use of panels of different thicknesses and characteristics.

A still further object of the invention is the provision of wall assemblies permitting window and door frames and the like to be readily incorporated in the wall by the same type of fastening elements employed for the panels. In one embodiment of the invention provision is made for securing glazing panels to members defining the window opening by the same fastening elements which engage the margins of panels surrounding the window opening. This general embodiment of the invention also provides for the elimination of special framing members around door openings.

A still further object of the invention is the provision of wall assemblies including corners, intersections, and the like embodying the snap-on fastening elements of the type referred to for securing the facing panels.

A still further object of the invention is the provision of a wall assembly of a character to permit shelving and other accessories to be supported exteriorly of the wall.

Our invention will be more fully understood and further objects and advantages will become apparent when reference is made to the more detailed description of preferred embodiments of the invention which is to follow and to the accompanying drawings in which:

Fig. 31 is a perspective view of a wall in accordance with the instant invention and incorporating a shelf bracket or the like;

Fig. 34 is a sectional view, on an enlarged scale, taken on the line 34—34 of Fig. 33;

Fig. 35 is a sectional view taken on the line 35—35 of Fig. 32;

Fig. 36 is a detail perspective view, on an enlarged scale, of the upper end of the bracket shown in Figs. 31 and 32;

Fig. 37 is a detail perspective view of the lower end of the bracket;

Fig. 38 is a sectional view illustrating special features of a wall construction employing relatively flexible facing panels;

Fig. 39 is an enlarged view corresponding to a portion of Fig. 38;

Referring now to the drawings and first to Figs. 1–7 inclusive, there is shown a wall or partition assembly employing a plurality of spaced studs 10, each preferably consisting of a channel member including flanges 12 and a web 14. Flanges 12 carry reinforcing reentrant flanges 16. The ends of the studs are carried in base and ceiling runners 18 and 20, respectively, of channel cross-section. The runners extend the length of the wall with the exception that the floor runners are interrupted, as will be understood, at door openings.

The studs may include extensions 22 (see particularly Figs. 7 and 8), to permit their lengths to be readily adjusted to the ceiling height. The extensions may be secured to the studs proper by bolts 24 extending through elongated slots 26. The flanges 12 of the studs and the corresponding flanges of the stud extensions as well are provided with openings 28 spaced longitudinally thereof and for a purpose later to be described. These openings are preferably enlarged at their upper ends, the sides tapering to form a narrow bight located substantially centrally of the flange.

Figures 2, 3, 4, 5, 5A:
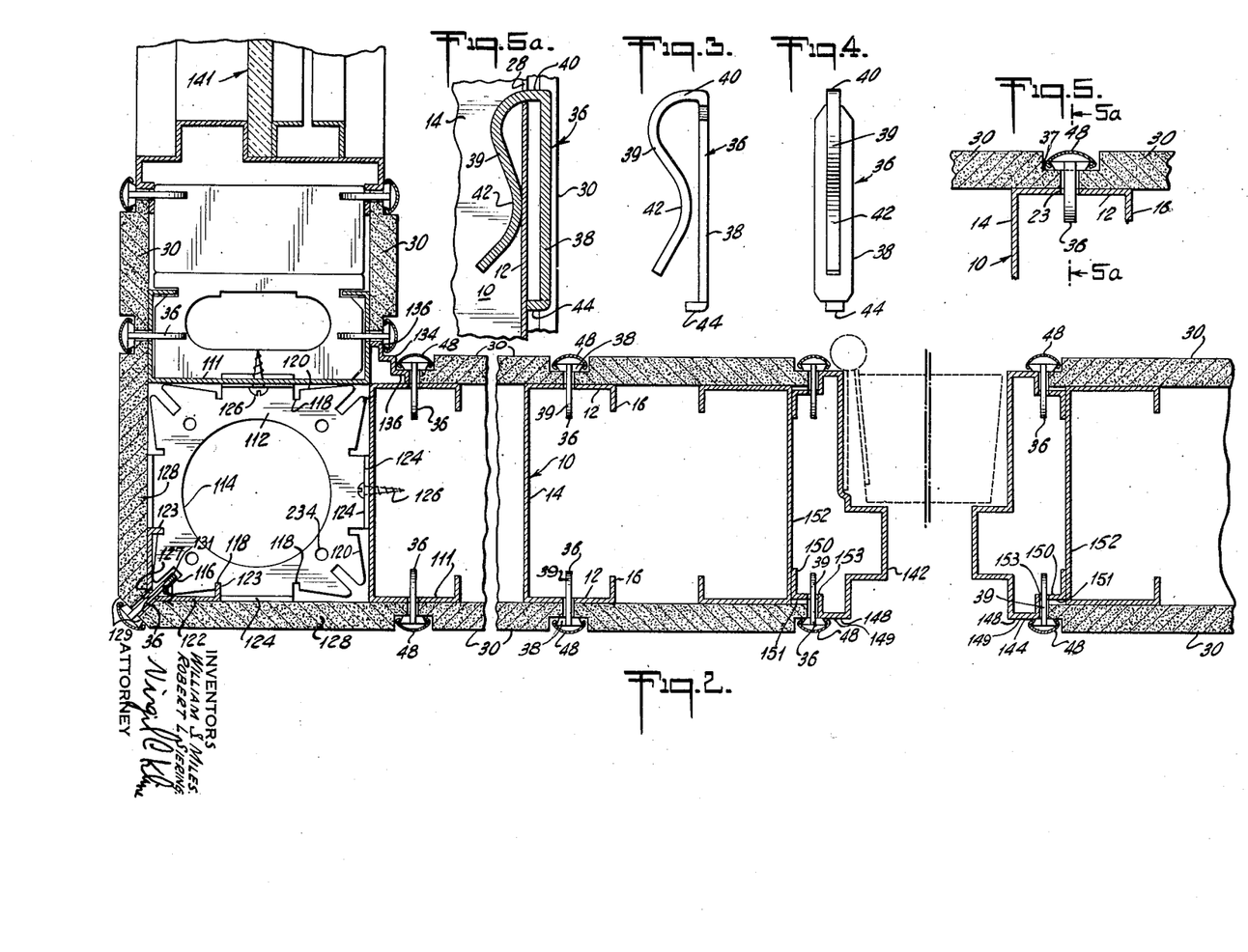
Fig. 2 is a sectional view, on an enlarged scale, taken on the line 2—2 of Fig. 1.
Fig. 3 is a side elevational view, on an enlarged scale, of a fastening element or clip employed in the instant invention.
Fig. 4 is a rear elevational view of the clip of Fig. 3.
Fig. 5 is a transverse, sectional view of a joint between facing panels illustrating the application of the clip.
Fig. 5a is a sectional view taken on the line 5a—5a of Fig. 5.

Facing panels 30 are carried by the studs, the panels forming the wall surfaces. The panels may be any suitable, relatively rigid material, for example, fiber-cement sheets such as asbestos-cement sheets, metal sheets, plastic sheets and the like. The lower edges of the panels are supported against downward movement on members or base clips 32 or 82 (see Figs. 6, 11–13 and 40–43), later to be described in detail, which are connected to the studs and which include shelves 34 or 84, respectively, on which the panels rest. The studs are spaced relatively to the panel widths so that adjacent panels form joints on the studs overlying, or substantially overlying, the apex of the V opening in the stud flanges, as best illustrated in Figs. 2 and 5. For purposes of example it may be stated that conventionally asbestos-cement panels are supplied in 2′ widths and, hence, where such panels are used, the studs are spaced 2′ O–C in straight runs of the wall.

The panels are secured against the studs by clips 36 (see particularly Figs. 3–5a inclusive), the clips being made of a resilient, springy metal such as spring steel. They include flat body portions 38 of substantial width and narrow arms 39 extending from the upper end of the body portion. The latter consist of straight sections 40 extending rearwardly at substantially right angles to the body portion and reversely curved S-sections 42. The inward bend of the S-section lies relatively close to the body section whereby the clip will resiliently bind the panels to the studs. Projecting rearwardly at the lower end of the body portions is a narrow aligning finger 44. The several elements of the clip are preferably of integral construction, although either the arm or finger, or both, may be separate elements welded to the body portion if desired. The substantial width of the body portion enables it to engage marginal portions of the adjacent panels, the narrower arm and finger extending between the panels (see particularly Figs. 5 and 5a).

Where facing panels of substantial thickness are used, for example, relatively rigid asbestos-cement panels having a thickness of 3/8″ or greater, the longitudinal edges of the panels are preferably recessed or rabbeted, as illustrated at 37 in Fig. 5, to countersink the body portion of the clip below, or substantially below, the outer surfaces of the sheet. If thinner panels are used, for example, relatively thin, flexible sheets of asbestos-cement or the like as shown at 46 in Figs. 2b, 38 and 39, the rabbeting is omitted and the body portions of the clips rest on the outer faces of the panels.

In the use of the clips the panels are laid against a stud in substantially contiguous relationship to each other to form a joint centrally of the stud flange, the panels being separated at the joint sufficiently to permit the arms and fingers of the clips to project between them. A clip 36 then has its arm 39 inserted between the panels opposite the enlarged upper end of one of the openings 28, the arm being projected through the opening until body portion 38 rests on the marginal portions of the panels. The clip is then forced downwardly until it is in the position shown particularly in Fig. 5a with the section 40 of the arm in contact, or substantial contact, with the stud at the lower end of the opening, and with the inwardly curved portion of section 42 in binding engagement with the rear face of the stud flange. The substantially triangular shape of openings 28 expedites the insertion of the clips and at the same time insures that the clips, when forced downwardly into final position, will be in alignment centrally of the stud flange. Aligning finger 44 extends between the facing panels at the joint and serves, together with straight section 40 of the spring arm, to maintain the body section in exact alignment with the joint (see particularly Fig. 5a). Additional clips are then inserted in a similar manner at the locations of the other stud openings, or at as many of them as is considered necessary under the particular circumstances involved, to secure the panels.

Figures 23, 28, 29, 30, 32:
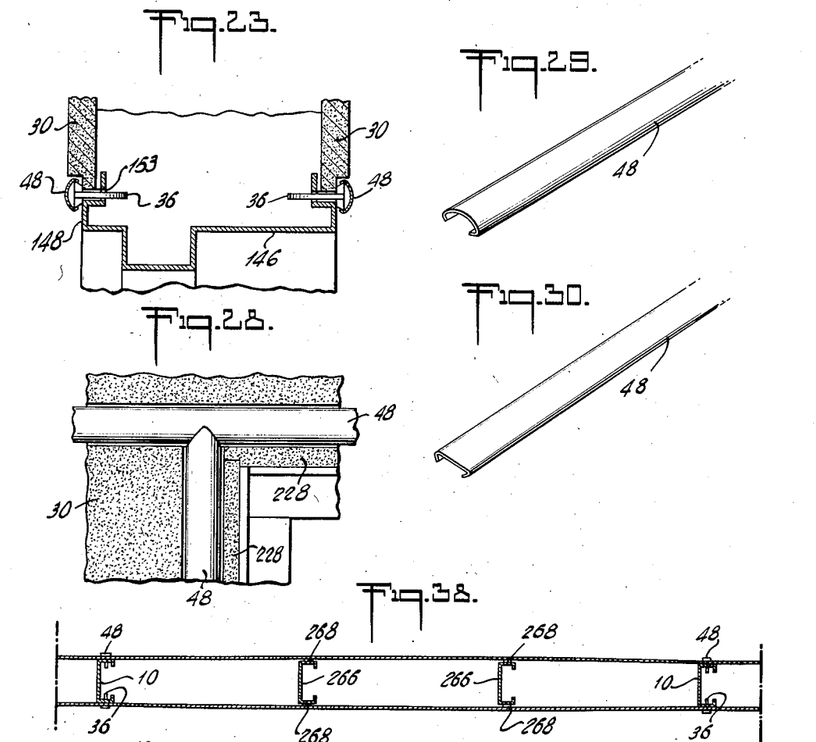
Fig. 23 is a sectional view, on an enlarged scale, taken on the line 23—23 of Fig. 1.
Fig. 28 is a front elevational view of the construction of Fig. 27.
Fig. 29 is a perspective view of molding or beading employed as a joint covering strip.
Fig. 30 is a perspective view illustrating a modified construction of the beading.
Fig. 32 is a sectional view, on an enlarged scale, taken on the line 32—32 of Fig. 31.

The joint may be concealed by snap-on beading strips 48 of conventional types, the several aligned body portions 38 of the clips forming, in effect, a discontinuous track to receive the strips. The beading extends longitudinally of the joint, preferably the full height thereof (see particularly Fig. 1). Where relatively thick panels with rabbeted edges are used, the outer face of the beading strips lie substantially in the plane of the panels. The strips may be of any conventional type but preferably for the rabbeted panels, the style shown in Fig. 29 having an outwardly bowed central panel is employed. A flatter strip as illustrated, for example, in Fig. 30, is preferably used where the body portions of the clips project beyond the panel faces (see the inner wall in Figs. 2b and 2b). It will be appreciated that the particular form of the bead may be varied as desired to produce a particular effect.

Referring now to Figs. 11–15 inclusive, one embodiment of the supporting members at the base of the wall will be described. The members 32 are made of sheet steel or the like and preferably are of integral construction. Each comprises a body section 50, the upper end of which is bent outwardly at right angles to provide the shelf 34 previously mentioned. Shelf 34 is of a width approximately equal to, but slightly less than, the thickness of the panels 30. A flange 52 extends downwardly from the outer edge of shelf 34. The central portion 53 of flange 52 is struck out and bent rearwardly into contact with the body portion 50, as illustrated best in Figs. 11 and 12, and welded or otherwise secured to brace the shelf against distortion under the weight of the panel. The cut-out also provides a keeper 54 for cooperation with a fastening element on the baseboard as will be later described. The lower edge of the body portion is bent outwardly to define a section 56 and then upwardly to form a flange 58, the latter also cooperating with a securing element on the baseboard. The width of the outwardly directed section 56 is preferably slightly greater than the thickness of the panel for a purpose later to be described.

Figure 15:
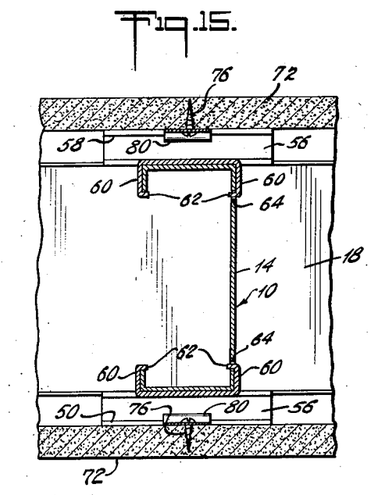
Fig. 15 is a sectional view, taken on the line 15—15 of Fig. 13.
Figure 16:
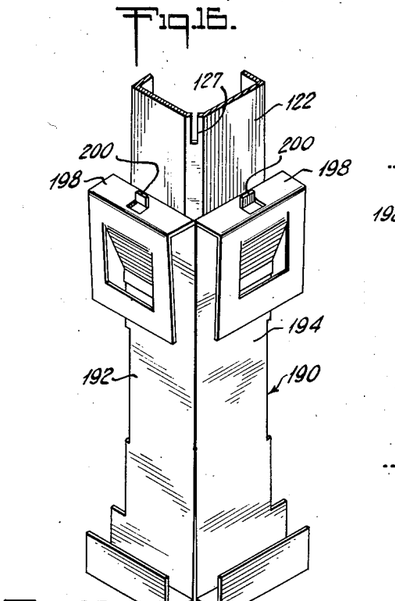
Fig. 16 is a perspective view of the corner construction adjacent the lower end of the wall.
Figures 17, 18, 19:
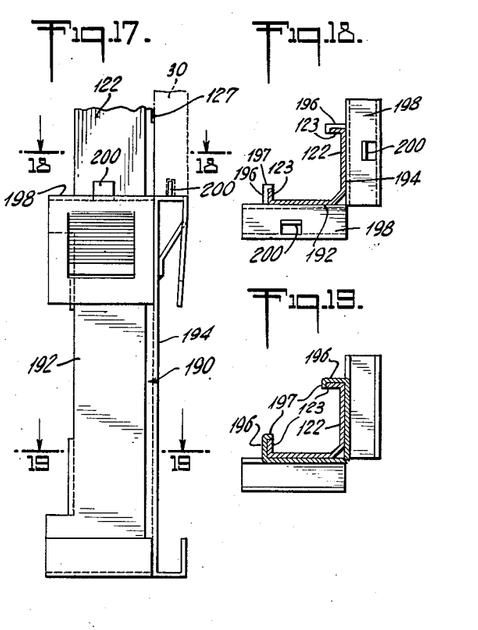
Fig. 17 is a side elevational view of the construction shown in Fig. 16.
Fig. 18 is a sectional view taken on the line 18—18 of Fig. 17.
Fig. 19 is a sectional view taken on the line 19—19 of Fig. 17.

Extending rearwardly from both edges of body section 50 are a plurality, preferably a pair, of spaced arms or wings 60 having inturned flanges 62 (see particularly Fig. 15). The lower end of the studs (see Figs. 9, 10 and 11) are provided with means to receive the inturned flanges. For this purpose the web of the stud is provided with slots 64 and reentrant flanges 16 are provided with notches 66 opposite the slots. In assembling a base member on a stud the inturned flanges of arms 60 which lie adjacent the web of the stud are inserted in the slots 64. The support member is then swung around and forced into its final position, the inturned flanges of arms 60 on the other side of the stud snapping into positions within notches 66. As shown particularly in Fig. 12, slot 64 and notches 66 are made of substantially greater length than the width of arm 60 to provide for substantial adjustment of the support members.

In order to insure engagement of the lower edge of the panels against the studs and to prevent their shifting out of alignment, the panels are preferably provided with grooves 68 in their lower edges to receive tangs 70 extending upwardly from shelves 34. Suitably the tangs are struck up from the metal of the shelf.

Members 32, in addition to supporting the panel members against downward movement, cooperate with attaching means carried by baseboards 72. The baseboards which may be made of any suitable slab material, preferably asbestos cement or the like, extend from the floor level to a point above the lower edge of the facing panels in accordance with conventional practice. They are secured to supporting members 32 by elements 74 (see particularly Figs. 12 and 14), the latter comprising strips of springy metal secured to the baseboards, as for example by screws 76. The upper end of the strip is reversely bent to define a downwardly directed leg 78 adapted to extend through the opening in flange 52 and resiliently engage against the rear face of keeper 54. The lower ends of the strips are provided with outwardly and downwardly directed legs 80 adapted to engage behind flanges 58 at the lower edges of the supporting members. Legs 78 and 80 are bent backwardly toward the elements with which they respectively engage to hold the baseboard in position under spring tension. Due to the construction of shelf 34 of somewhat less width than the facing panel and of flange 56 of greater width, baseboard 72 is supported at a slight angle which insures the engagement of its upper, inner edge against the panels to provide a finished appearance and avoid unsightly cracks.

Figure 40:
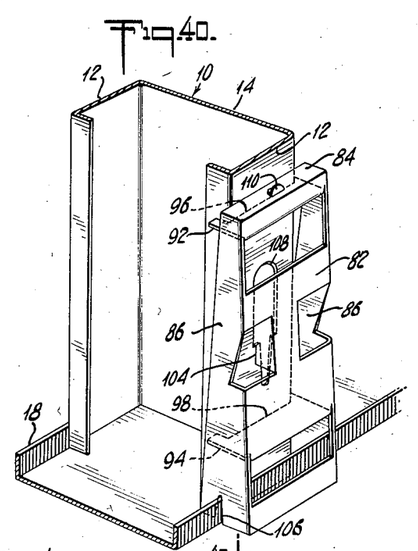
Fig. 40 is a perspective view similar to Fig. 11 illustrating the construction at the lower end of the wall in a modified embodiment thereof.
Figures 41, 42:
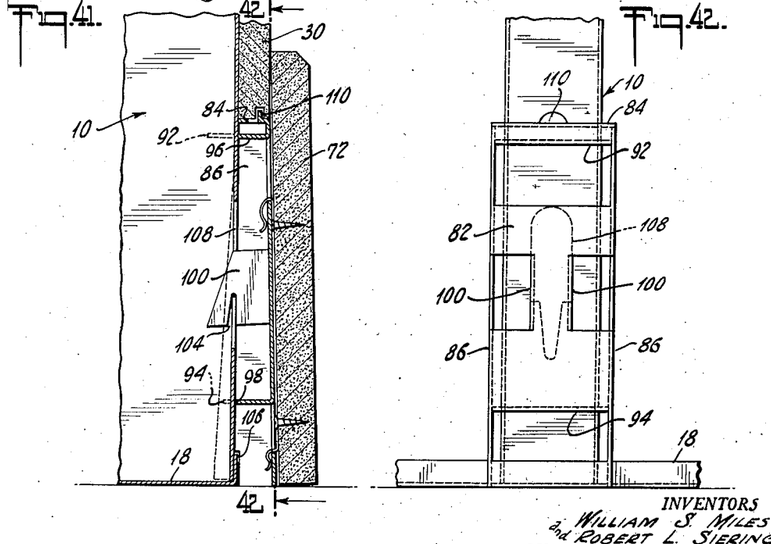
Fig. 41 is a view similar to Fig. 12 but of the modified construction of the base support.
Fig. 42 is a front elevational view of the construction shown in Fig. 41 with the baseboard and wall panel omitted.
Figure 43:
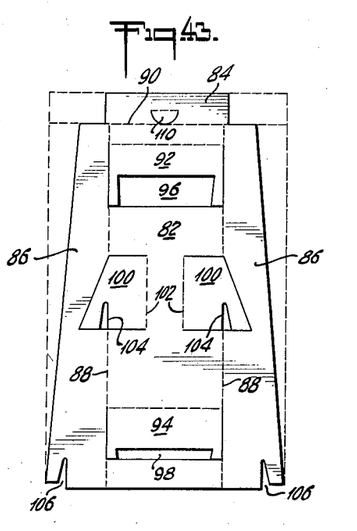
Fig. 43 is a plan view of the blank from which the modified base support is fabricated.

Referring now to Figs. 40–43 inclusive, a modified construction of the base clip is illustrated. In this embodiment the clip is also made from a single blank of material but requires only cutting and bending steps, welding operations being eliminated. The clip consists of a body or forward section 82, an upper flange 84 and side flanges 86. Flanges 86 are bent rearwardly on bending lines 88 to lie on opposite sides of the stud flange, and upper flange 84 is bent downwardly on bending line 90 to define the shelf for supporting the face panels. Adjacent the upper and lower ends of the body section 82 are struck out flanges 92 and 94, respectively, extending rearwardly at substantially right angles to the body portion and having cut-out openings 96 and 98. Opening 96 is deeper than opening 98 whereby, when the clips are mounted on the studs with the bases of the notches in contact with the studs, as illustrated in Figs. 40 and 41, the supporting member is slanted relatively to the stud to insure contact of the upper edge of the baseboard with the facing panels. Intermediate members 92 and 94 are projections or wings 100 cut from the blank of material and bent backwardly on bending lines 102. Each of the projections is provided with a notch 104. The lower ends of side flanges 86 are also provided with notches 106 spaced from the bending lines 88 sufficiently to fit over the edge flange of the floor runner. For this embodiment of the invention the stud flange opposite projections 100 is provided with a shouldered opening 108 to receive projections 100, the notches in the projections being spaced from the body portion to fit over the shoulders, as illustrated in Fig. 41. The particular shape of opening 108 is not important so long as it permits the insertion of the projections and has edges or shoulders to be received in notches 104 but that shown is preferred as the same shape may be used for openings 28 which receive the arms of clips 36 whereby all the openings in the stud may be the same for simplicity in manufacture. Shelf 84 is suitably provided with a struck up tang 110 which has the same function as the tang 70 in the other embodiment.

The supporting member is mounted on the stud by inserting projections 100 through the opening 108 and forcing the member downwardly with the notches 104 receiving the shoulders of the opening and notches 106 receiving the flange of the floor runner. Flanges 92 and 94 embrace the stud with the edges of the cut-outs contacting the stud. Baseboard 72 carrying elements 74 as before is secured to the supporting member by inserting legs 78 and 80 of the element through the openings left in the body portion by struck up flanges 92 and 94 and forcing the baseboard downwardly with the edges of the body portion at the openings received behind legs 78 and 80.

Figure 24:
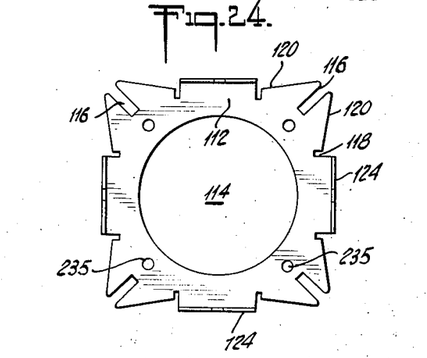
Fig. 24 is a plan view of a holding clip employed in the wall construction.

Referring now again to Figs. 1, 2 and 2b, provision is made for corners and for intersecting walls. Considering first the corner construction illustrated in detail in Fig. 2, studs 111 which are identical with studs 10 employed in straight runs of the wall are arranged at the corner with their webs in intersecting planes and with their flanges directed away from the corner. The studs are secured together by a plurality of vertically spaced holding clips 112 (see particularly Fig. 24).

The holding clips are constructed for universal application, that is, for use in corners turning in either direction and for the wall intersections to be later described. The clips have central apertures 114 to permit the passage of wiring and other service lines. Each corner of the clip is provided with an inwardly and diagonally directed, relatively deep notch 116 adapted to receive the arm 39 of a panel securing clip 36. Adjacent the corners are notches 118, the sides 120 of the clips slanting inwardly from the corners to, say, one-half the depth of the notches 118. This construction provides for the reception of corner strip 122. Upwardly directed flanges 124 are provided intermediate the corners of the holding clip, the flanges being perforated to receive sheet metal screws 136 or other attaching devices to secure the studs to the holding clip.

Corner strip 122 includes flanges 123 extending inwardly from the side edges of the strip for a distance not greater than the depth of notches 118. The strip is provided at the intersection of its side walls with vertically spaced slots 127 suitably equal in spacing and number to the openings 28 in the studs.

In the corner construction shown, a corner strip 122 is mounted opposite the intersection of the webs of the corner studs 111 by forcing it into position with its flanges 123 by snapping into notches 118 adjacent the exposed corners of the holding clips. Narrow facing panels 128 of a width to extend from the mid-point of the flanges of studs 111 to substantially a line of intersection on the corner strip are employed. The edges of these narrow facing panels at the corner are machined to define outer and inner chamfers, the outer chamfers 129 lying in the same plane and the inner chamfers 131 lying in parallel planes spaced apart sufficiently to receive the arms of panel securing clips 36 therebetween. The facing panels 128 form joints on studs 111 with the adjacent panels 30 and form a joint on corner strip 122 with each other and are secured to the studs and to the corner strips by clips 36, the arms of the clips on the corner passing through the slots 127 in the corner strip.

At the inner corner, facing panels 30 terminate in a normal manner adjacent the mid-point of the flanges of studs 111. To fill the corner and to provide surfaces for engagement by the body portion of clips 36, a filler strip 134 is employed, the filler strip having shoulders 136 of a height to be in alignment with the marginal edges of the panels at the bottom of the rabbet or in alignment with the face of the panel if the unrabbeted, thinner facing panels are used. The clips 36 are employed in the manner previously described, the clips holding the panels and the filler strip in position against the flanges of studs 111.

Figure 2A:
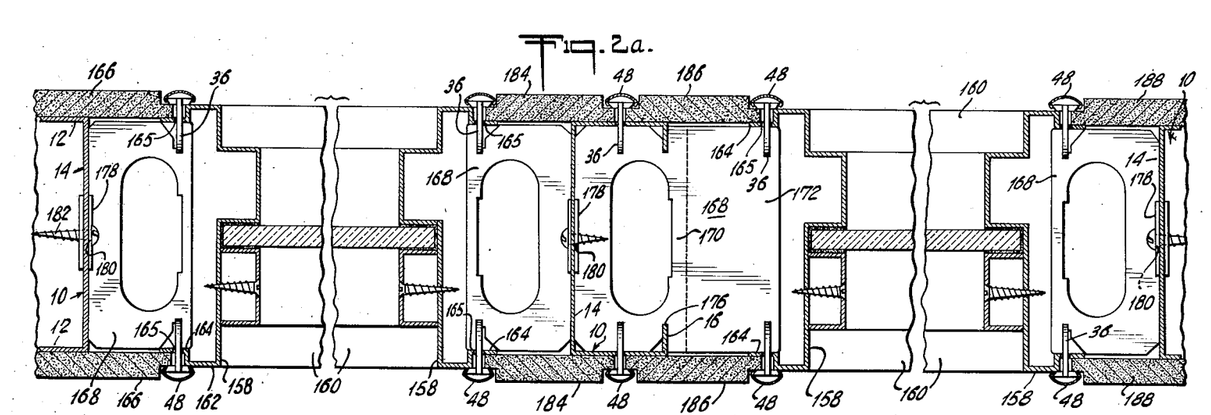
Fig. 2a is a sectional view, on an enlarged scale, taken on the line 2a—2a of Fig. 1.
Figure 2B:
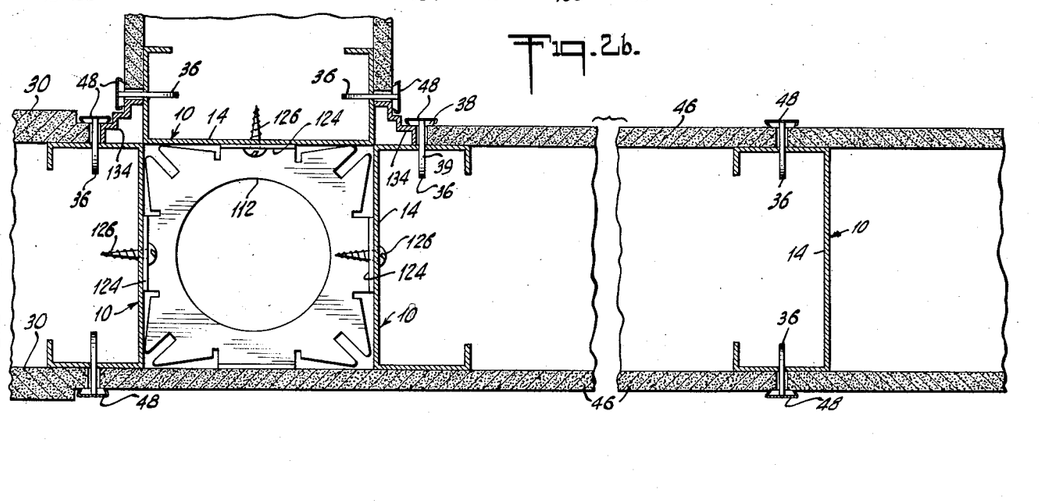
Fig. 2b is a sectional view, on an enlarged scale, taken on the line 2b—2b of Fig. 1.

Referring now particularly to Fig. 2b, a wall intersection is illustrated. A plurality of vertically spaced holding clips 112, of the type previously described, connect two studs 10 of the straight running wall, the studs being placed back to back and spaced apart a distance equal to the width of the web of an end stud 10 of the intersecting wall. The several studs are secured together through the medium of the holding clips by sheet metal screws 126 passing through flanges 124 of the clips and the webs of the studs.

It will be appreciated that the junctions of the facing panels 30 of the intersecting wall with the facing panels 30 of the straight running wall involve the same problem as the inner corner construction just previously described and the problem is solved in the same way. Filler strips 134 are inserted at the inner corners defined by the intersecting wall with the straight wall and clips 36 are used to secure the marginal edges of the facing panels of both walls and the clips to the studs.

As previously mentioned the facing panels may be either of substantial thickness and rabbeted at the edges to accommodate the securing clips 36 or may be of lesser thickness to permit the body portions of the securing clips to rest directly on the outer faces of the panels. Fig. 2b illustrates such variation, as well as the case where thinner facing panels are used in one section of the wall and thicker panels in the other. It will be quite clear that no erection problems whatsoever are raised by such requirements.

Figure 1:
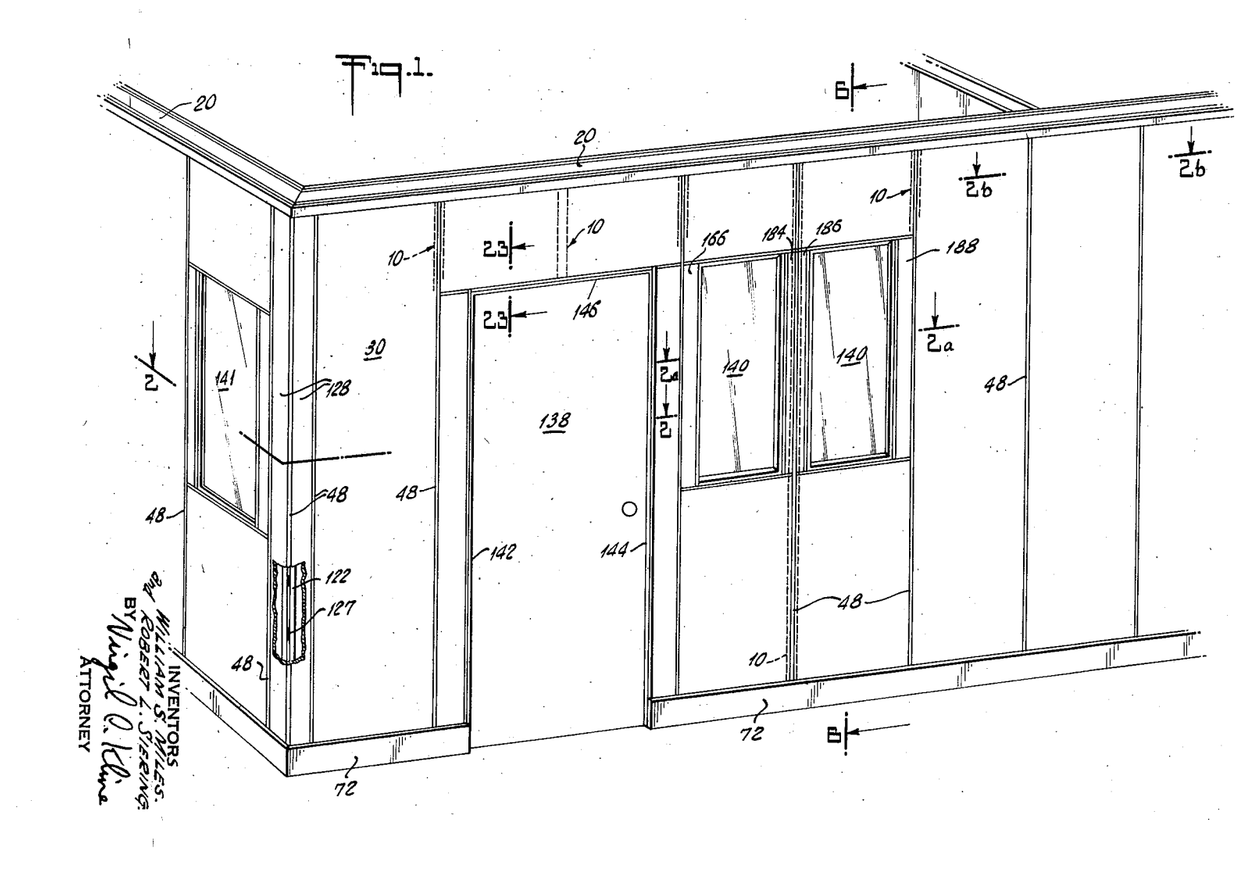
Fig. 1 is a perspective view of a wall assembly in accordance with the instant invention.

Provision is also made for the insertion of door and window openings illustrated at 138 and 140, respectively, in Fig. 1. Referring now particularly to Figs. 2 and 23, the door frame construction will first be described. The door frame consists of a butt side buck 142 and a strike side buck 144 connected at the top by horizontal frame member 146. Each of these elements has stepped edges 148 with the outer steps 149 in alignment with the planes of the marginal portions of the facing panels on opposite sides of the wall, and with the inner steps 151 approximately in alignment with the planes of the inner faces of the facing panels. The inner steps of the door buck also include inner flanges 150 welded or otherwise secured to members 152 which may in all respects be similar to studs 10 but which, in this case, serve only as reinforcing and supporting elements for the bucks. The inner steps of both the vertical and horizontal frame members are provided with spaced slots 153 in line with the joints between the adjacent facing panels and the outer steps, the slots being of a width and length to receive the arms 39 of the panel securing clips 36. The door frame is secured in the assembly by the spring clips, the arms 39 extending between the edges of the panels and the stepped edges of the bucks and horizontal frame member and through slots 153 and into engagement behind the inner steps.

Figure 6:
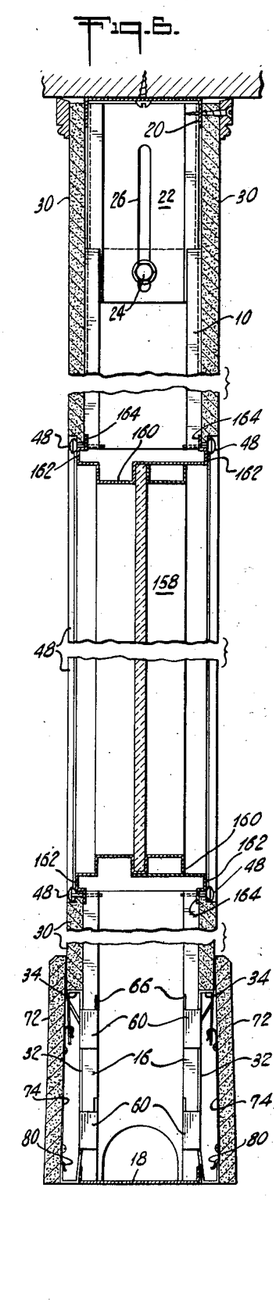
Fig. 6 is a sectional view, on an enlarged scale, taken on the line 6—6 of Fig. 1.
Figures 7, 8, 9, 10:
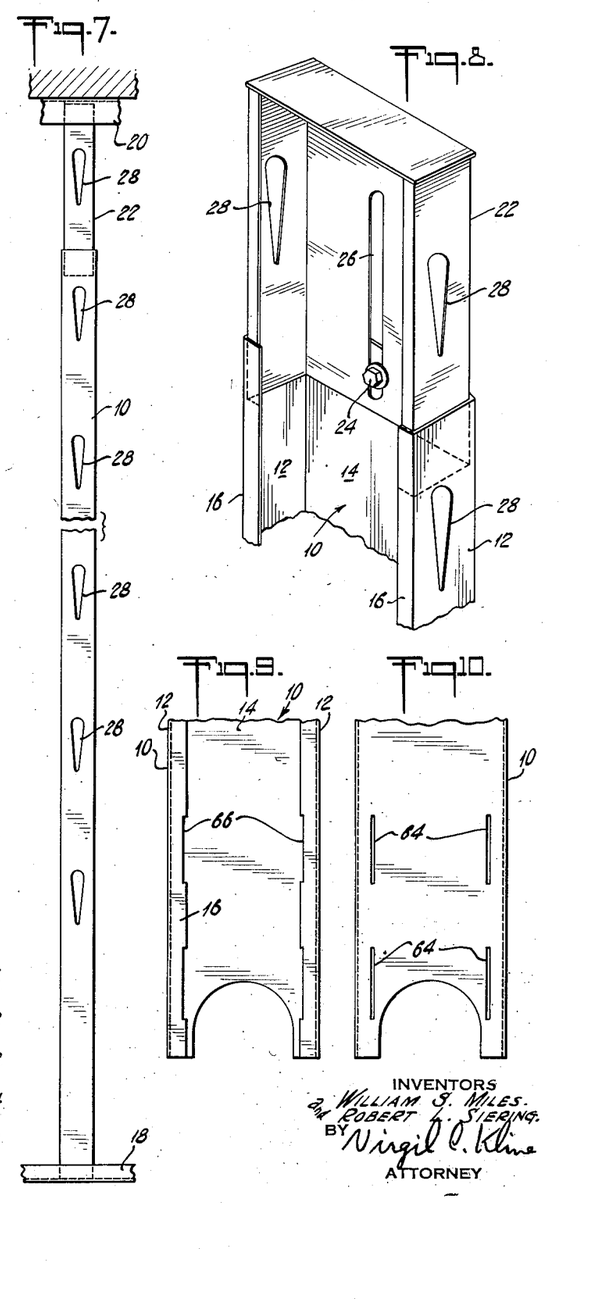
Fig. 7 is a side elevational view of a stud employed in the assembly.
Fig. 8 is a detail perspective view, on an enlarged scale, illustrating the upper end of the stud construction of Fig. 7.
Fig. 9 is a detail elevational view of the lower end of one embodiment of the stud looking toward one face thereof.
Fig. 10 is a view similar to Fig 9 but looking toward the opposite face of the stud.
Figure 11:
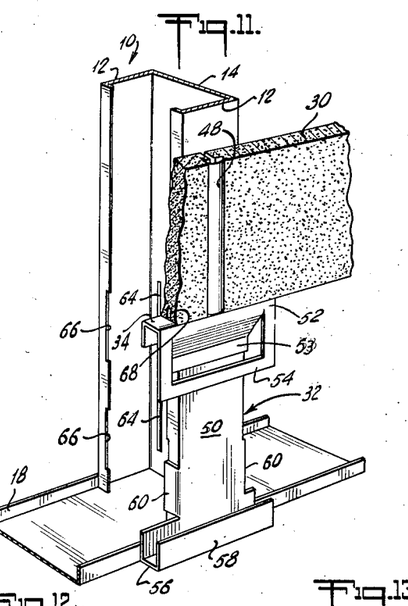
Fig. 11 is a perspective view of the construction adjacent the lower end of the wall.
Figure 12:
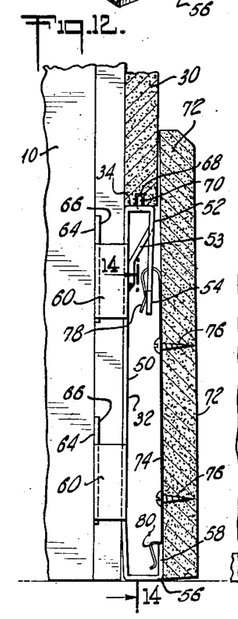
Fig. 12 is a sectional view taken on the line 12—12 of Fig. 13.
Figure 13:
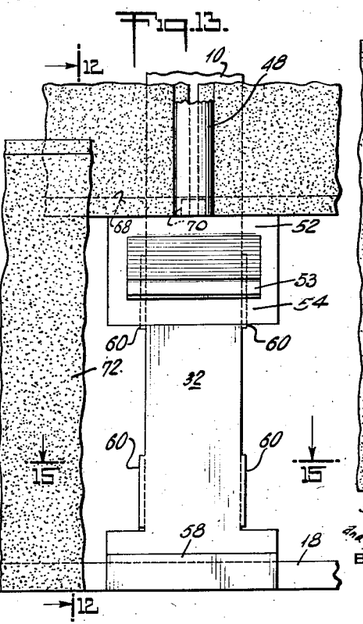
Fig. 13 is a front elevational view, on an enlarged scale, of the construction shown in Fig. 11.
Figure 14:
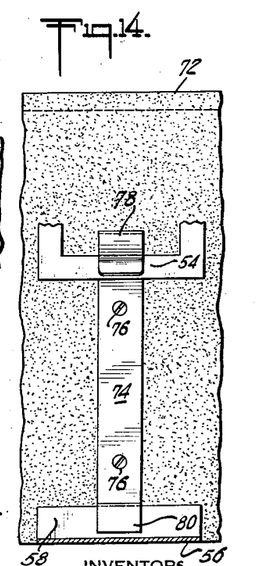
Fig. 14 is a sectional view, taken on the line 14—14 of Fig. 12.

Figs. 2a and 6 illustrate a construction for a double window with an intervening mullion. The window frames consist of similar vertical and horizontal frame members 158 and 160, respectively, including stepped edges having outer steps 162 in line with the planes of the marginal portions of the facing panels and inner steps 164 substantially in line with the planes of the inner faces of the facing panels. The inner step of each of the frame members is provided with spaced slots 165 of corresponding size and position to slots 153 of the door frame members. Inasmuch as the windows are normally of lesser width than the standard facing panel, means are provided for spacing the frames from the regular studs 10.

Figure 25:
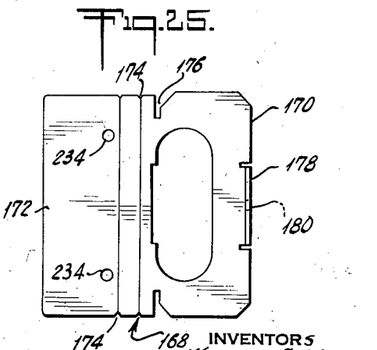
Fig. 25 is a plan view of a spacer clip employed in the wall construction.

The spacing means comprise spacer clips 168 (see Fig. 25 for details of the clips), each spacer clip consisting of a main section 170 and an extension 172. Extension 172 is provided with edge notches 174 at spaced points to define break-off lines whereby the clip may be shortened to permit its use in different situations. Section 170 is separated from extension 172 by notches 176 adapted, where necessary, to receive reentrant flanges 16 of the studs as will later be more fully explained. Section 170 also includes an upwardly extending flange 178 formed with an aperture 180 to receive a holding screw or the like.

Referring first to the left-hand one of the pair of windows, it will be seen that a spacer clip 168 is secured to the web of stud 10 by screw 182 passing through the aperture 180 of flange 178 and threaded into the stud. The spacer clip is broken off at the inner break-off line in this instance, as only this much of the clip is needed and the end of the clip is inserted between the inner steps of the frame. It will be understood that a plurality of the spacer clips is used. At the mullion intermediate the windows a central stud 10, which extends the full height of the wall, carries spacer clips 168, those at the left of the stud being broken off similarly as the clips on the opposite side of the window. The spacing clips 168 on the right side of the stud are oppositely directed and, in this case are of full length, section 170 being inserted between the flanges of the stud with the reentrant flanges 16 entering notches 176 and extension section 172 projecting between the inner steps 164 of the frame member of the right-hand window. On the opposite side of the right-hand window the structure is identical with that employed for the corresponding side of the left-hand window, spacer clips 168 being secured to a stud 10 and projecting between the inner steps of the frame member. Narrow facing panels 184 and 186, respectively, span the spaces between the stud 10 at the center of the mullion and the adjacent frame members of the two windows. Similarly narrow facing panels 166 and 188 span the spaces between the frame members at the outer sides of the windows and the adjacent studs 10. The facing panels are secured by clips 36 with their arms passing through the joints between the panels or between the panels and the frame members and through the openings in the stud or openings 165 in the inner steps of the frame members. The horizontal elements 160 of the window frames have the same stepped edges as the vertical members, as previously pointed out, and the horizontal edges of the facing panels above and below the window are secured thereto by clips 36 in the same manner that the vertical edges of the other panels are secured to the vertical members of the window frame. As will be understood the facing panels below the windows support the weight of the window frames and sash.

Where a single window is to be included in the wall, for example window 141 (see Figs. 1 and 2), the operations are similar to those described above, the arrangement of the spacers and other elements being the same as for the outer sides of the double window.

Referring now to Figs. 16–22 inclusive, the construction of base clips and auxiliary members at the corners and at door openings and the like will be described. The base clip 190, illustrated particularly in Figs. 16–19 inclusive, may consist of two, preferably integrally joined sections 192 and 194 lying at right angles to each other, and each of similar construction to member 32, except that only the outer edges of the sections are provided with arms 196 with inturned flanges 197. The sections each includes a shelf 198 with an upstruck tang 200. The member is applied to the corner strip 122 by snapping it into position, flange 197 engaging the edges of flanges 123. The facing panels which meet at the corner to form a joint thereon, as illustrated in Fig. 2, rest on the shelves 198 with tangs 200 entering the slots in the panel edges to maintain the panels in contiguous relationship at the corner. The baseboards are secured on the base clips in the same way previously described for the straight run construction, the baseboards suitably forming a butt joint or a mitre joint, as desired.

Figure 20:
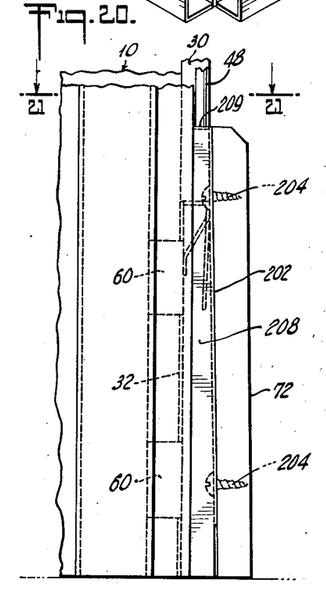
Fig. 20 is a detail end elevational view of a portion of the wall construction at a door opening in accordance with one embodiment of the invention.
Figure 21:
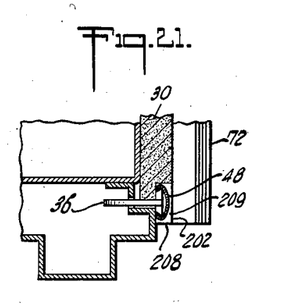
Fig. 21 is a sectional view taken on the line 21—21 of Fig. 20.
Figure 22:
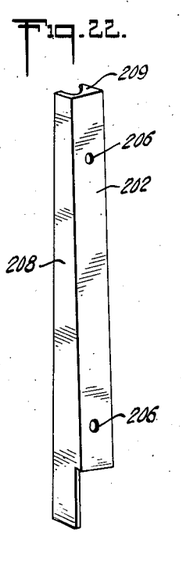
Fig. 22 is a detail perspective view of a filler element employed in the construction of Fig. 20.

At the door openings the baseboard 72 is continued substantially to the inner edge of the door frame (see Fig. 21) in substantial alignment with the edge of the beading overlying the clips securing the ends of the panels to the frame members. The beading 48 terminates approximately at, but preferably slightly below, the upper edge of the baseboard, inasmuch as no panel securing clips are used below that point and, hence, if it was continued its end would be unsecured. To fill the remaining space, a filler element 202 (see Figs. 20 and 22) is secured to the inner side of the baseboard at the end thereof as by screws 204 passing through perforations 206. The filler strip includes a side flange 208 extending to the door frame member and top flanges 209 having a cut-out to fit around the beading.

Figures 26, 27:
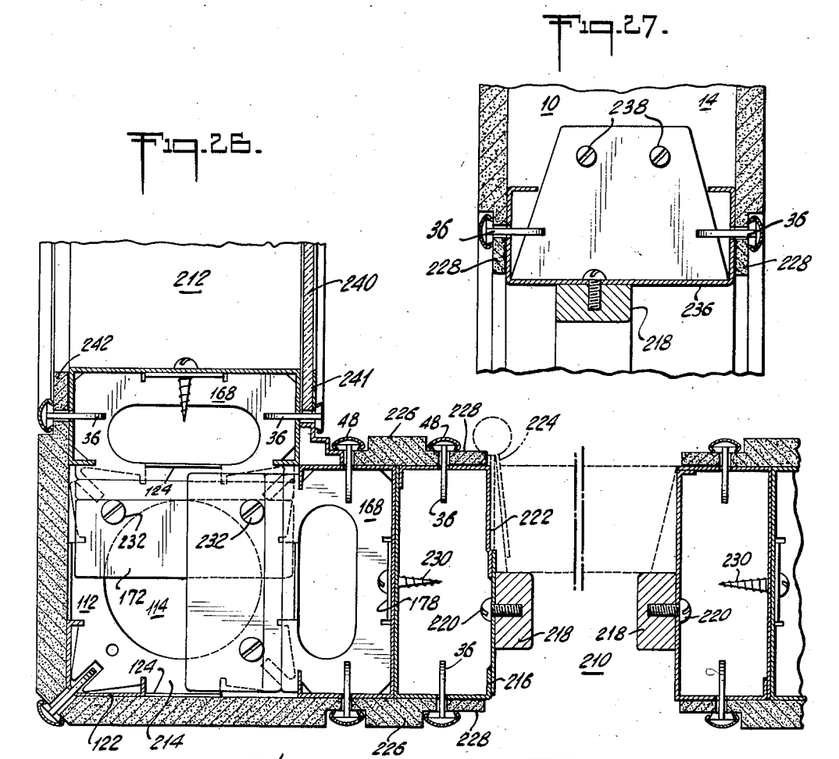
Fig. 26 is a view similar to Fig. 2 but illustrating a modification.
Fig. 27 is a view similar to Fig. 23 but illustrating a modification.
Figures 31, 32, 33, 34, 35, 36, 37:
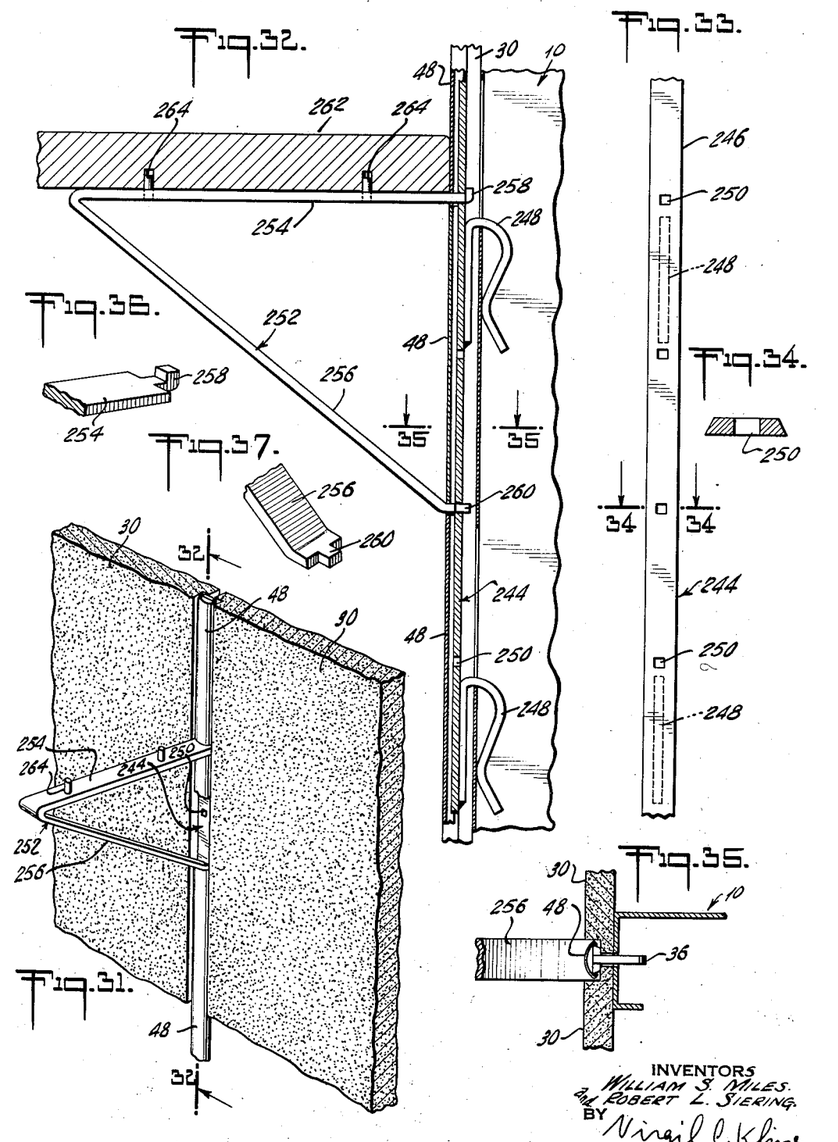
Figure 33:
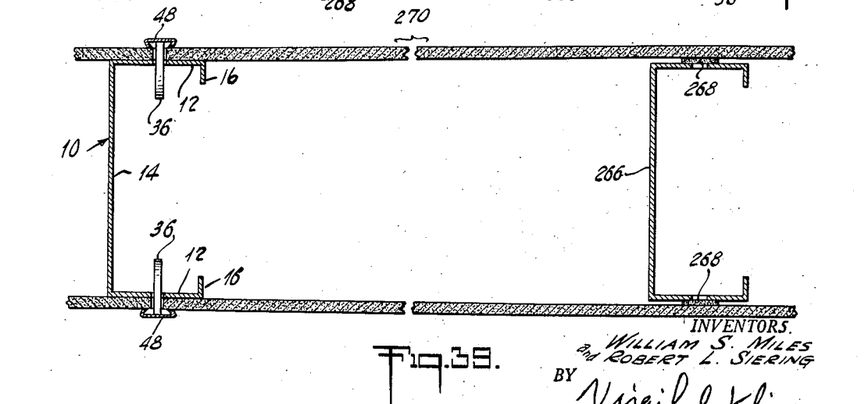
Fig. 33 is a detail view of an element employed in the construction of Figs. 31 and 32.

Referring now to Figs. 26, 27 and 28, a modified construction for door and window openings which do not require separate framing members as in the previous form, will be described. Fig. 26 is a horizontal section taken for convenience through a wall including door opening 210 and window opening 212, the window and door lying in intersecting walls defining a corner 214. Referring first to the door opening, a modified stud is employed at this location, the stud in its simplest form consisting of the web and a flange of each of two studs welded together to form, in effect, a box stud 216 which, in addition to its normal function, serves as the door buck or framing member. Conventional door stops 218 are secured to the box studs as by screws 220, the stops being attached before the bucks or box studs are assembled. The box stud on the butt side will have embossed or depressed portions 222 to accommodate the leaves of the hinges 224. Narrow facing panels 226 extend between the next adjacent studs and the box stud opening, the narrow panels being secured by the panel securing clips 36. Thin strips of facing material 228 are cemented to the box studs or bucks adjacent the door opening, the strips having a thickness equal to the marginal portions of the adjacent panels 226 whereby they provide a seat for the body portions of the clips 36 and, in addition, provide a finished appearance to the door opening (see Fig. 28). The box studs are secured against movement by spacer clips 168 of the type previously described. Screws 230 pass through the flanges 178 of the spacer clips and the webs of the studs 10 and adjacent box stud or door bucks. In the construction shown in Fig. 26 where the door is adjacent a corner, the spacer clips on the corner side are of full length and section 172 extends into the corner and is secured to the holding clip 112 by screws 232 passing through preferably preformed perforations 234 and 235 of the spacer and holding clips, respectively.

The door header, illustrated in Fig. 27, comprises simply a section 236 of the same material used for studs 10, the section carrying a door stop 218. The ends of the web are bent upwardly and secured by bolts or screws 238 to the webs of the adjacent studs 10, the header overlying the ends of the box studs. Narrow strips 223 are cemented along the edges of the header and the facing panels above the door opening are secured to the header by clips 36.

In the window construction, the glazing panel 240 covers the opening at one side of the wall and is secured by clips. In other words the glass is merely substituted for the normal facing panel at one side of the wall. At the opposite side narrow strips 242 of the facing panel material of the same thickness as the marginal portions of the regular facing panels are cemented to the studs and to the horizontal frame members (not shown) at the edges of the window opening, and clips 36 engage the margins of the facing panel and the strips. The margins of the glazing panel are preferably covered by a thin strip 241 of rubber or the like. It will be appreciated that at both sides of the window the studs are turned so that their webs are toward the window opening. Where the window is located adjacent a corner as shown, stud 10 is tied into the corner structure by a spacer clip 168.

The adaptability of the wall construction of the instant invention to support auxiliary devices is illustrated in Figs. 32–37 inclusive. As there shown means may be readily provided to secure shelves, for example, exteriorly of the wall surface. For this purpose special fastening clips 244 are used in lieu of the clips 36 at the selected locations. The special clips each comprise a strip 246 carrying clip elements 248 spaced apart a distance equal to, or to a multiple of, the distance between openings 28 of the studs. Clip elements 248, so far as their securing function is concerned, operate identically with clips 36. Strip 246 is of dove-tail cross-section, as shown, to define a continuous track for the reception of beading 48. In addition it is provided with a plurality of apertures 250 to support shelf brackets or the like. In the shelf construction illustrated for purposes of example, brackets 252 are used, each including a supporting arm 254 and a brace 256. Arm 254 has an upwardly turned narrow extension 258 to fit within one of the apertures 250, and brace 256 has a narrow horizontal extension 260 to fit within a lower one of the apertures 250. A shelf or the like 262 may rest upon the brackets and be held in any suitable way as by pins 264 projecting upwardly from arms 254 into seats on the under side of the shelf.

To mount the shelf at any suitable location on the wall the beadings overlying, say, two or more joints, depending on the length of the shelf, are removed and a sufficient number of the clips is also removed to accommodate strips 246. A bracket 252 is mounted on the strips by first inserting extension 258 in an aperture 250 and swinging the bracket downwardly until extension 260 enters another of the apertures 250. The remaining brackets are similarly mounted. The shelf is then placed on the brackets and by its weight holds the assembly in position. Sections of the beading 48 cut to the required lengths are then mounted on the tracks formed by strips 246 and by the body portions of clips 36 at the locations beyond the ends of the strips 246.

It will be understood that the shelf construction has been described only for purposes of illustration and that other devices may be similarly supported.

Referring now to Figs. 38 and 39, a special feature is illustrated which may be employed where the relatively thin, flexible facing panels 46 are used, particularly on wide spans. The wall construction, as far as its major features are concerned, is the same as before. However, one or more studs 266 are mounted intermediate the studs 10 which underlie the ends of the panels. Studs 266 carry preferably adhesively secured strips 268 of a resilient material, such as rubber or felt, the strips being of sufficient thickness to bow the thin panels 46 outwardly and tension them to some extent. This arrangement greatly lessens the tendency of the panels to drum or vibrate.

The constructions described above provide a wall or partition which can be easily and quickly erected and later altered or removed without destroying or materially reducing the value of any of the parts. Inasmuch as the facing panels are an integral part of the supporting structure of the wall they reinforce the wall and permit the use of relatively lightweight studs, reducing the over-all weight and cost of the wall. For example, it has been determined that the studs may be made of sheet steel of 20 gauge or lower. The wall is entirely fireproof, containing no combustible materials. It readily adapts itself to special conditions with a minimum number of different parts.

Having thus described our invention in rather full detail, it will be understood that these details need not be strictly adhered to but that various changes and modifications may suggest themselves to one skilled in the art, all falling within the scope of the invention as defined by the subjoined claims.

What we claim is:

1. A wall assembly including a channel stud, a base clip, and a facing panel secured to said stud, said stud having reentrant flanges, said stud being positioned with its web extending transversely of the wall and having notches in its reentrant flanges and slots in its web opposite said notches, said base clip comprising a member defining a shelf supporting the panel against downward movement and having arms embracing a portion of the web and a reentrant flange, respectively, and including tangs projecting into said slots and said notches respectively.

2. In a wall assembly, a supporting member, wall panels forming a joint on the member, detachable means engaging the margins of the panels at the joint and cooperating with the member in holding the panels against outward movement, and panel supporting means positively secured to and braced by the member, by interengagement therewith, adjacent the lower end thereof, said panel supporting means supporting the panels against downward movement, the arrangement serving in effect to integrate said member and said panel supporting means as a strong and rigid panel support structure.

3. In a wall assembly as defined in claim 2, a baseboard and means on said baseboard and said panel supporting means in interengagement and detachably securing the baseboard to said panel supporting means.

4. In a wall assembly as defined in claim 2, said detachable means resiliently engaging the margins of the panels at the joint, and said panel supporting means having means thereon interengaged with, and aligning, the bottom edges of the panels at the joint.

5. In a wall assembly as defined in claim 2, said supporting member having an opening underlying the panel joint, said detachable means comprising a clip having a flat body portion resting on the margins of adjacent panels and a spring arm extending between said panels and through said opening and yieldingly engaging the rear face of the supporting member, an aligning finger secured to said body portion at a point spaced substantially therealong from the point on said body portion from which the spring arm extends, said aligning finger maintaining said body portion in alignment with said joint.

6. A wall assembly as defined in claim 2, in which said supporting member has a shouldered aperture adjacent the lower end thereof, and said panel supporting means has struck out projections in interlocking engagement with said shouldered aperture to provide the positive securement of said panel supporting means to said supporting member and the bracing of said panel supporting means by said supporting member.

7. A wall assembly as defined in claim 2, in which said supporting member has a shouldered aperture adjacent the lower end thereof, and said panel supporting means comprise more particularly a member formed from a single blank and having a forward section spaced from the stud, a flange extending from the upper edge of said section and defining a shelf providing the support for the panels against downward movement, struck out projections intermediate the ends of said section in interlocking engagement with said shouldered aperture, struck out flanges above and below said projections respectively, embracing said stud, said projections, shouldered aperture, and flanges providing for the positive securement of said panel supporting means to said supporting member and the bracing of said panel supporting means by said supporting member, and said panel supporting means having means for attaching cooperation with a baseboard.

8. In a wall assembly, a stud, wall panels forming a joint on said stud, means engaging the margins of said panels and cooperating with the stud in holding the panels against outward movement, and a member secured to the stud adjacent the lower end thereof supporting the panels against downward movement, said member defining a shelf on which said panels rest, wings on said member and cooperating means on said wings and said stud in positive interengagement and securing the member to the stud, so as to brace said member and to integrate said members and said stud as a strong and rigid panel support structure.

9. In a wall assembly as defined in claim 8, means on said shelf interengaging and aligning the adjacent bottom edges of the panels at the joint, a baseboard having an upper margin overlapping the panels, the baseboard extending substantially to the floor, and cooperating means on said member and baseboard detachably interengaged and securing the baseboard to the member.

10. In a wall assembly, a stud, wall panels forming a joint on the stud, means securing the panels to the stud, against outward movement, a member having means in positive interengagement with and held securely by the stud adjacent the lower end thereof, said member supporting the panels above the floor, a baseboard having an upper margin overlapping the panels, the baseboard extending substantially to the floor, and cooperating means on said member and baseboard detachably interengaged and securing the baseboard to the member, said cooperating means on said member and baseboard comprising vertically spaced flanges on the member with the uppermost flange between the plane of the outer face of the panels and the stud and with the lowermost flange substantially outwardly of said plane and an attaching device on said baseboard including an upper looped finger projecting behind the uppermost flange and resiliently securing the baseboard to said member with its upper edge engaging the panel faces to provide a finished appearance and a lower finger engaging behind the lowermost flange.

11. A wall assembly including a stud, a base clip, a facing panel, and means holding said facing panel against outward movement with respect to said stud, said base clip comprising a body section extending vertically of the stud, said base clip having means comprising arms extending rearwardly from said body section embracing a portion of said stud in positive interengagement with the stud and securing the base clip thereto with the base clip braced by the stud and providing therewith a strong and rigid panel supporting structure, said base clip comprising further a flange extending outwardly from said body section and defining a shelf supporting said panel against downward movement, means reinforcing the shelf, a section extending from said shelf and defining a flange for interengagement with a securing element of a baseboard, and a flange extending outwardly adjacent the lower edge of the body section and having an upwardly directed extension for interengagement with a securing element of a baseboard.

12. A wall assembly as defined in claim 11, which includes a tang struck up from said shelf embedded in said panel and serving as an aligning means for the lower edge of the panel.

13. A wall assembly including a floor runner comprising a U-shaped channel, a supporting member having a shouldered aperture adjacent its lower end and its lower end mounted in the U-shaped floor runner with the legs of the U embracing the lower end of said supporting member, wall facing panels forming a joint on said supporting member, detachable means engaging the margins of the panels at the joint and cooperating with said supporting member in holding the panels against outward movement with respect to said supporting member, a base clip comprising a member formed from a single blank of material and having a forward section spaced from said supporting member and including an upward, rearwardly directed flange defining a shelf on which the facing panels rest, struck out projections intermediate the ends of said section in interlocking engagement with said shouldered aperture, rearwardly directed side wings having slots in interlocking engagement over the flange of said floor runner, and rearwardly directed flanges above and below said projections, respectively, and embracing said stud, said interlocking engagement of the stud, base clip, and floor runner providing a strong and rigid panel support structure.

14. In a double-faced wall assembly including a corner, channel shaped studs at the corner with their webs lying in intersecting planes and their flanges extending away from the corner, a holding clip secured to said webs and maintaining said studs in fixed relationship, and having edges with notches therein, a corner strip at the corner opposite the line of intersection of said planes having legs lying respectively in said planes, and flanges on said legs engaged in said notches, said corner strip being positioned by said holding clip, said corner strip and the flanges of said studs having apertures, a plurality of facing panels defining longitudinal joints on the studs and on the corner strip, the joints overlying said apertures, clips including body portions overlying the margins of the panels and having arms extending between the panels and through the apertures and securing the panels against movement outwardly from said studs, and a base clip secured to the corner strip adjacent the lower end thereof, said base clip having shelves supporting the lower edges of the panels adjacent the corner.

References Cited in the file of this patent

UNITED STATES PATENTS

| | | |
|---|---|---|
| 1,553,965 | Thomas | Sept. 15, 1925 |
| 1,815,065 | Lucy | July 21, 1931 |
| 1,846,625 | Whiting | Feb. 23, 1932 |
| 1,872,429 | Eaglesfield | Aug. 16, 1932 |
| 1,923,906 | Berger | Aug. 22, 1933 |
| 2,010,412 | Parsons | Aug. 6, 1935 |
| 2,048,153 | Wollaeger | July 21, 1936 |
| 2,053,482 | Kellogg | Sept. 8, 1936 |
| 2,075,955 | Parsons | Apr. 6, 1937 |
| 2,121,962 | Glass | June 28, 1938 |
| 2,124,775 | Haugaard | July 26, 1938 |
| 2,150,497 | Fernberg | Mar. 14, 1939 |
| 2,175,717 | Kerr | Oct. 10, 1939 |
| 2,200,649 | Wardle | May 14, 1940 |
| 2,217,574 | Tinnerman | Oct. 8, 1940 |
| 2,313,839 | Olsen | Mar. 16, 1943 |
| 2,317,634 | Olsen | Apr. 27, 1943 |
| 2,317,635 | Olsen | Apr. 27, 1943 |
| 2,356,730 | Auten | Aug. 29, 1944 |
| 2,375,409 | Glitsch | May 8, 1945 |
| 2,390,857 | Tucker | Dec. 11, 1945 |
| 2,406,315 | Blocher | Aug. 27, 1946 |
| 2,576,557 | Baum | Nov. 27, 1951 |

FOREIGN PATENTS

| | | |
|---|---|---|
| 556,754 | Great Britain | 1943 |